United States Patent [19]

Masutake et al.

[11] Patent Number: 5,342,641
[45] Date of Patent: Aug. 30, 1994

[54] FOOD ADDITIVE COMPRISING WATER-SOLUBLE HEMICELLULOSE

[75] Inventors: Kenji Masutake, Kawanishi; Hirokazu Maeda, Ibaraki; Toshimasa Kawamata, Koshigaya; Masatoshi Miyamae, Sakai; Kenji Taguchi, Matsudo; Yoshiaki Yonemitsu, Osaka; Masahiro Yoshizaki, Toyonaka; Tomoyuki Toyama, Higashiosaka, all of Japan

[73] Assignees: Fuji Oil Co., Ltd.; San-Ei Chemical Industries, Ltd., Japan

[21] Appl. No.: 905,733

[22] Filed: Jun. 29, 1992

[30] Foreign Application Priority Data

| Jul. 2, 1991 | [JP] | Japan | 3-189197 |
| Jul. 2, 1991 | [JP] | Japan | 3-189198 |
| Jul. 2, 1991 | [JP] | Japan | 3-189199 |
| Dec. 21, 1991 | [JP] | Japan | 3-361565 |

[51] Int. Cl.$^5$ .................... A23L 1/0534
[52] U.S. Cl. .................... 426/549; 426/590; 426/652; 426/653; 426/574; 426/583; 426/379; 426/658
[58] Field of Search ............... 426/658, 548, 804, 549, 426/590, 652-653, 574

[56] References Cited

U.S. PATENT DOCUMENTS

| 4,038,481 | 7/1977 | Antrim | 536/56 |
| 4,927,654 | 5/1990 | Barnett et al. | 426/548 |
| 5,112,964 | 5/1992 | Aoe et al. | 536/56 |

FOREIGN PATENT DOCUMENTS

| 22541/88 | 5/1991 | Australia . |
| 22598/88 | 5/1991 | Australia . |
| 77022/91 | 7/1992 | Australia . |
| 59-143554 | 8/1984 | Japan . |
| 60-027365 | 2/1985 | Japan . |
| 64-62303 | 3/1989 | Japan . |
| 1-104144 | 4/1989 | Japan . |
| 2016101 | 1/1990 | Japan . |
| 2-303459 | 12/1990 | Japan . |
| 3049662 | 3/1991 | Japan . |
| 3058758 | 3/1991 | Japan . |
| 3-37904 | 6/1991 | Japan . |
| 3-502407 | 6/1991 | Japan . |
| 3-236759 | 10/1991 | Japan . |
| 3-280858 | 12/1991 | Japan . |
| 3-290157 | 12/1991 | Japan . |
| WO90/05460 | 5/1990 | PCT Int'l Appl. . |

OTHER PUBLICATIONS

*Soybeans: Chemistry and Technology*, vol. 1, 1972, pp. 89 and 92.

*Food Chemistry*, Second Edition, Revised and Expanded, p. 123.

"Polysaccharides of Soybean Seeds-Part I-Polysaccharide Constituents of 'Hot-Water-Extract' Fraction of Soybean Seeds and an Arabinogalactan as its Major Component," Morita, Makio, *Agr. Biol. Chem.*, vol. 29, No. 6, pp. 564-573, 1965.

"Polysaccharides of Soybean Seeds-Part II-A Methylated Arabinogalactan Isolated from Methylated Product of 'Hot-Water-Extract' Fraction of Soybean Seed Polysaccharides," Morita, Makio, *Agr. Biol. Chem.*, vol. 29, No. 7, pp. 626-630, 1965.

"Polysaccharides of Soybean Seeds-Part III-1,-4-Linked Galacto-di- and Trisaccharides from Partial Acid Hydrolysate of the 'Hot-Water-Extract' Fraction of Soybean Seed Polysaccharides," Morita, Makio, et al., *Agr. Biol. Chem.*, vol. 31, No. 3, pp. 314-318, 1967.

"Rheological Behavior of Soluble Polysaccharide Fractions from Soybeans," Thompson, D. B., et al., *Food Hydrocolloids*, vol. 1, No. 4, pp. 333-337, 1987.

"Non-Starch polysaccharides of Seeds of Soybean," Ravindran, G., *J. Natn. Sci. Coun. Sri Lanka*, vol. 16, No. 2, pp. 223-228, 1988.

*Primary Examiner*—Jeanette Hunter
*Attorney, Agent, or Firm*—Wallenstein, Wagner & Hattis, Ltd.

[57] ABSTRACT

There is disclosed a food additive comprising a water soluble hemicellulose resulting from a degradation of a protein by degrading water insoluble vegetable fibers containing protein under acidic conditions of at about the isoelectric point of the protein and at a temperature of 130° C. or lower, and composed of rhamnose, fucose, arabinose, xylose, galactose, glucose and uronic acid. This food additive is useful as a dispersant, a protein stabilizer, a modifier, and/or a foaming agent for food. Food containing the food additive is also disclosed.

12 Claims, No Drawings

FOOD ADDITIVE COMPRISING WATER-SOLUBLE HEMICELLULOSE

BACKGROUND OF THE INVENTION

1. Field of the Invention

The present invention relates to a food additive comprising water-soluble hemicellulose, more particularly, hemicellulose derived from oil seeds and cereals, and to food containing such an additive.

2. Description of the Related Art

In the preparation of acid protein foods, to prevent an agglomeration and precipitation of protein, in general, a thickener such as himethoxyl pectin (HM pectin), sodium carboxycellulose, or alginic acid propylene glycole ester is utilized. Such a thickener, however, can not completely prevent an agglomeration and precipitation of protein. A phenomenon such as phase separation or precipitation can be prevented by increasing an amount of thickener, but this gives a "heavy" taste and is not popular. Therefore, several attempts to prevent a phase separation and precipitation at low viscosity have been made, but these attempts have not been successful.

Preferably food such as meat and fish jelly products are hard to masticate, and such a property is obtained by increasing the gel strength in the food. This gel strength is achieved, for example, by a network structure obtained by dissolving actomyosin of protein in a solution of salt, and thereafter, heating and denaturating same. To increase the gel strength, polysaccharides such as starch or pullulan are added, but currently, even in meat and fish jelly products such as ham, sausage, and boiled fish paste, there is a demand for softer products. Accordingly, an attempt to lower the gel strength by adding calcium ion or denaturating protein in part was made, but a pleasant feeling when biting into the food has not been obtained yet. Particularly, in meat and fish jelly products, a palatable product having an uneven texture is desired, but such a product has not been developed as yet.

Further, in bakery products such as biscuits, crackers, and sponge cake, a large quantity of fat, margarine and/or emulsifying agent is added to the raw material to improve the palatability thereof. Currently, however, those having a lower fat content are preferred, for their low calorific value, and the use of a large quantity of fat has a defect in that the taste of these products becomes unpleasant. Accordingly, in the preparation of bakery products, gum is added instead of fat or an emulsifying agent. Nevertheless, there is a problem in that the gum itself is expensive and the palatability is not sufficient. Also, even in bakery products, softer products are desired. Further, improvements in storage techniques have enabled the shelf-life of a food to be prolonged. Therefore, during the storage, preferably there is little reduction the palatability of the food.

Also, a nonionic surfactant such as sugar esters, polyglycerine ester, monoglycerides, etc., is utilized as a foaming agent, and it is known that albumen and its decomposition product has a foaming ability. For example, the albumen is utilized in the preparation of meringue. Nevertheless, the foaming agents utilized for food at present are easily affected by pH and temperature changes, and have a poor foaming ability of a lack of stability of the foam itself, and therefore, are not widely used for various purpose. A technique of adding cyclodextrin as an adjuvant, to improve the foaming ability of the albumen, has been developed, but the foaming ability and foam stability are still not sufficient for some specific applications.

SUMMARY OF THE INVENTION

Accordingly, an object of the present invention is to provide a food additive which overcomes the above-identified problems. More specifically, an object of the present invention is to provide a food additive comprising water-soluble hemicellulose derived from oil seeds and cereals, which is effective as a dispersant, a stabilizer for protein, a palatability modifier, and/or a foaming agent.

These and other objects, features and advantages of the invention will become more apparent from the detailed description and examples given below.

DESCRIPTION OF THE PREFERRED EMBODIMENTS

The additive of the present invention comprises hemicellulose derived from oil seeds and cereals. The hemicellulose is composed of rhamnose, fucose, arabinose, xylose, galactose, glucose and uronic acid as the constituent saccharide component, and has an average molecular weight of from 50,000 to 1,000,000, preferably from 100,000 to 400,000.

This hemicellulose is obtained by degrading water-insoluble vegetable fibers containing protein under acidic conditions, preferably at about the isoelectric point of the protein, and at a temperature of from 80° to 130° C., preferably from 100°–130° C.

As water-insoluble vegetable fibers containing protein, there can be used residues obtained by removing husks, fats and oils or protein from oil seeds, e.g., soybeans, palm, coconut, corn, cotton seed, etc., and residues obtained by removing grounds, starch and the like from cereals, e.g., rice, wheat, etc.

The food additive of the present invention can be used for various foods, for example, acid protein foods, nonacid protein foods, bakery products, and the like.

The term "acid protein foods" as used herein means lactic acid bacteria beverage, fermented milk, acid milk beverage, and acid beverage in which fruit juice or acid is added to a protein beverage such as milk.

By adding the additive of the present invention to the acid protein foods, the agglomeration, precipitation, phase separation and the like of protein in the acid protein foods can be prevented. The additive of the present invention may be added to acid protein foods in an amount of 0.1–10%, preferably 0.2–2% based on the weight of the acid protein foods. Also as a thicker, himethoxyl pectin, sodium carboxycellulose, or alginic acid propylene glycole ester can be used together. The amount of the thickener should be such that the foods obtained show no gelatinization.

The term "non acid protein foods" as used herein means the foods which contain protein at more than 3 wt %, preferably more than 5 wt %, most preferably more than 8 wt % and the pH is more than 5.5, preferably more than 6.0. The term protein herein includes vegetable and animal protein.

By adding the additive of the present invention to the nonacid protein foods, foods having an uneven texture and palatability are obtained. The additive of the present invention may be added to the nonacid protein foods in an amount of 0.3–50 wt %, preferably 0.5–30 wt % based on 100 weight parts of protein component. Also as the thickener, polysaccharides such as agar, guar gum, gum arabic, gum tragacanth, pectin, pullulan etc., and a water-soluble protein such as gelatin, albumen, and sodium caseinate may be added.

The terms "bakery products" as used herein means a product obtained by baking a raw material such a flour or starch, for example, a biscuit, cracker, or sponge cake.

By adding the additive of the present invention to the bakery products, foods having a palatability are obtained without increasing the calorie content, and the stability thereof is improved. The additive of the present invention may be added to the bakery products in an amount of 0.1-15 wt % based on 100 weight parts of the raw materials. Also, a thickener as stated above may be added.

Also, the additive of the present invention is useful as a foaming agent or foam stabilizer for foods. The additive of the present invention has a foamability not easily affected by pH and temperature changes. Also, if the additive is utilized in combination with other foaming agents, the foam stability is improved. As the other foaming agents, there can be used an ester of polyvalent alcohol and aliphatic acid such as sucrose fatty acid ester or sorbitan fatty acid ester and surfactant for foods such as monofatty acid ester of glycerin or polyglycerin.

The invention will be understood more readily with reference to the following examples; these examples are intended to illustrate the invention and do not to limit the scope thereof.

Example 1

Preparation of the additive of the present invention

To the residues obtained by extracting protein from soybeans, twice the amount of water was added, and hydrochloric acid was added to the mixture to adjust the pH to 4.5. Then the mixture was degraded by heating at a temperature of 120° C. for 1.5 hours. After cooling, the resulting degraded material was centrifuged at 10,000 g for 30 min. and a precipitated fraction containing the aggregated protein was removed to obtain a supernatant wherein a water-soluble hemicellulose was dissolved. Then the precipitated fraction was washed with an equal weight of water, and centrifuged to obtain a supernatant. This supernatant was combined with the previous supernatant, and the mixture treated by passing same through an activated carbon column. The resulting eluent was dried to obtain water-soluble hemiceliulose (A).

Further, this water-soluble hemicellulose was dissolved in 0.5% saline solution and a reprecipitaion was repeated three times so that the ethanol concentration become 50%. The mixture was desalted by using an ion exchange resin "Amberlite IR-120B", manufactured by Organo to obtain a water-soluble hemicellulose (B).

Then, in the same manner, water-soluble hemicellulose (C) was obtained except that the activated carbon column treatment was omitted.

The result are shown in Table 1.

TABLE 1

| Component | Composition of hemicellulose | | |
|---|---|---|---|
| | A | B | C |
| Water | 5.71 | 7.75 | 5.10 |
| Crude protein | 1.93 | 1.03 | 5.43 |
| Crude ash content | 5.29 | 0.22 | 5.30 |
| Polysaccharides | 37.07 | 91.00 | 84.17 |

TABLE 1-continued

| Component | Composition of hemicellulose | | |
|---|---|---|---|
| | A | B | C |
| Average molecular weight | 178,000 | 207,000 | 114,000 |

From the table, it is seen that pigment component, hydrophobic component and low molecular weight component were removed by the activated carbon treatment.

The water-soluble hemicellulose of (A), (B), and (C) were analyzed for the saccharide composition. The uronic acid was measured by the Blumenkranz method, and the neutral saccharide was measured by the alditol-acetate method.

The results are shown in Table 2.

TABLE 2

| Saccharides | Saccharide composition (wt %) | | |
|---|---|---|---|
| | A | B | C |
| Uronic acid | 20.4 | 16.9 | 19.4 |
| Rhamnose | 1.6 | 2.7 | 2.1 |
| Fucose | 2.7 | 5.2 | 3.9 |
| Arabinose | 19.9 | 19.2 | 23.1 |
| Xylose | 6.4 | 8.4 | 5.8 |
| Galactose | 47.3 | 46.8 | 43.4 |
| Glucose | 1.8 | 0.9 | 2.3 |

Example 2

Acid protein foods (acid milk beverage) were prepared according to the following process, i) 3 parts of skim milk powder were added to 20 parts of water at an ambient temperature, and the mixture was stirred until dissolved.
ii) 7 parts of sugar were added to 20 parts of water, and this mixture was stirred until dissolved.
iii) To 0.1–10 parts of the water-soluble hemicellulose (A) were added 20 parts of water and the mixture was stirred at 80° C. for 10 min. until dissolved, and then cooled to 7° C.
iv) The above liquid i)–iii) was mixed, and while stirring at 10°–20° C. 50 w/w % of citric acid was added to adjust the pH to 4.5, and water added to a total of 100 parts.

One part of the mixture resulting from iv) was homogenized, and the other part was not homogenized. Further each one part of the homogenized mixture and non-homogenized mixture were sterilized at 85° C. for 30 min., and the other part was not sterilized. The presence of a precipitate and supernatant, and of gelatinization, was observed in the four parts, and the results are shown in Table 3.

TABLE 3

| Amount of WSHC | sterilized | | | not sterilized | | |
|---|---|---|---|---|---|---|
| | prec. | sup. | gelatinization | prec. | sup. | gelatinization |
| 0.1 | − | + | ○ | + | − | ○ |
| 0.3 | − | − | ○ | − | − | ○ |
| 0.5 | − | − | ○ | − | − | ○ |
| 1.0 | − | − | ○ | − | − | ○ |
| 2.0 | − | − | ○ | − | − | ○ |
| 3.0 | − | − | △ | − | − | △ |
| 10.0 | − | − | △ | − | − | △ |
| 0.1 | + | + | ○ | ++ | + | ○ |
| 0.3 | + | + | ○ | ++ | + | ○ |
| 0.5 | + | + | ○ | ++ | + | ○ |
| 0.7 | + | − | ○ | ++ | − | ○ |
| 1.0 | + | − | ○ | + | − | ○ |
| 2.0 | − | − | ○ | − | − | ○ |

TABLE 3-continued

| Amount of WSHC | sterilized | | | not sterilized | | |
|---|---|---|---|---|---|---|
| | prec. | sup. | gelatinization | prec. | sup. | gelatinization |
| 3.0 | − | − | Δ | − | − | Δ |
| 10.0 | − | − | Δ | − | − | Δ |

Upper column: homogenized
Lower column: not homogenized
+: precipitation or supernatant present
−: precipitation or supernatant absent
○: not gelatinization
Δ: slight gelatinization From the result of table 3, it is apparent that a sample that is not homogenized has more precipitation and supernatant than a sample that is homogenized which is less stable. If homogenized, the hemicellulose stabilized the sample at amounts of more than 0,1%, and did not show gelatinization at amounts of 0.1-2%.

Example 3

In the same manner as in Example 2, an acid beverage was prepared except that the sample was sterilized at 85° C. for 30 min. after adjusting the pH to 4.0 and HM pectin, CMC-Na, PGA and/or hemicellulose added alone or in combination as a stabilizer. The results are shown in Table 4.

TABLE 4

| dispersant | | | | stability | | |
|---|---|---|---|---|---|---|
| 7-pectin | CMC-Na | PGA | WSHC | prec. | sup. | gelatinization |
| 0.4 | − | − | − | − | ± | x |
| − | 0.4 | − | − | + | ++ | x |
| − | − | 0.4 | − | + | + | x |
| − | − | − | 0.4 | − | − | ○ |
| 0.3 | − | − | 0.1 | − | − | ○ |
| 0.2 | − | − | 0.2 | − | − | ○ |
| 0.1 | − | − | 0.3 | − | − | ○ |
| 0.3 | − | − | − | + | + | ○ |
| − | 0.3 | − | − | + | ++ | ○ |
| − | − | 0.3 | − | + | ++ | ○ |
| − | 0.3 | − | 0.1 | − | − | ○ |
| − | − | 0.3 | 0.1 | − | − | ○ |

From the results of Table 4, HM pectin, CMC-Na and PGA produced precipitation and supernatant and provided gelatinization at a level of 0.4%, and at a level of 0.3%, produced precipitation and supernatant but less gelatinization. By adding the hemicellulose of the present invention to those which contain 0.3% HM pectin, CMC-Na or PGA, the gelatinization was alleviated, and the formation of a precipitate and supernatant were prevented.

Example 4

Acid milk beverage was prepared according to the following composition.

| | |
|---|---|
| skim milk powder | 1.0 part |
| sugar | 14.0 |
| water | 40.0 |
| hemicellulose | 0.2 |
| water | 44.2 |
| 10% lactic acid solution | 0.5 |
| yogurt flavor | 0.1 | i) 1 part of skim milk powder and 14 parts of sugar were added to 40 parts of water, and the mixture stirred.

ii) 0.2 part of hemicellulose was added to 44.2 parts of warm water, and the mixture was stirred at 80° C. for 10 min.

iii) The liquid i) and ii) was mixed and mildly stirred for 10 min.

iv) To the mixture of iii) was added 0.5 part of 10% lactic acid solution, and 0.1 part of yogurt flavor and water were added to mixture to make up 100 parts.

v) The mixture of iv) was sterilized at 95° C. for 30 sec.

The resulting product was an acid milk beverage having a good yogurt flavor and homogeneous turbidity, which did not produce a precipitate and supernatant after 3 months.

Example 5

An acid milk beverage was prepared according to the following composition.

| | |
|---|---|
| fermented milk | 15.0 parts |
| 2 w/w % hemicellulose solution | 20.0 |
| sugar | 7.0 |
| strawberry fruit juice | 10.0 |
| water | 48.0 | i) 21 parts of skim milk powder were added to 79 parts of water and dispersed. The mixture was sterilized at 90°-95° C. for 15 min. and cooled to 40° C. As a starter, 3 parts of a commercially available plain yogurt was added, and fermented in a thermostatic chamber at 38° C. After grinding the curd, the mixture was cooled to 10°-15° C. to give a fermented milk.

ii) 2 parts of hemicellulose were added to 98 parts of hot water, and the mixture was stirred at 80° C. for min. and cooled to 25° C. to provided a 2 w/w % hemicellulose solution.

iii) 7 parts of sugar were dissolved in 30 parts of water.

iv) 10 parts of strawberry fruit juice were added to 18 parts of water to provide a dilute solution of fruit juice.

v) 15 parts of fermented milk from i), 20 parts of a 2 w/w % hemicellulose solution from ii), 37 parts of sugar solution from iii) and 28 parts of a dilute solution of fruit juice from iv) were mixed and adjusted to a pH of 3.8 by an addition of 59% lactic acid. The mixture was heated to 90° C. and sterilized, and thereafter, the mixture was homogenized at 85° C., charged into a polyethylene terephthalate bottle, and allowed to cool.

The product was stored in a refrigerator for 1 month, and the stability and gellatilization thereof observed. A good sterilized lactic acid beverage not having a precipitate and supernatant or gellatilization was observed.

Example 6

A yogurt beverage was prepared according to the following composition.

| | |
|---|---|
| fermented milk | 40.0 parts |
| 2 w/w % hemicellulose solution | 20.0 |
| 2 w/w % HM pectin solution | 10.0 |
| sugar | 7.0 |
| water | 23.0 |

According to the method of Example 2, fermented milk and a 2 w/w % hemicellulose solution were prepared. Also, a 2 w/w % HM pectin solution was prepared by adding 2 parts of HM pectin to 98 parts of hot water and stirring for 10 min. at 80° C., and then cooling to 25° C. A sugar solution was prepared by dissolving 7 parts of sugar into 23 parts of water.

Then 40 parts of fermented milk, 20 parts of a 2 w/w % hemicellulose solution, 10 parts of a 2 w/w % HM pectin solution, and 30 parts of sugar solution were mixed, the mixture was adjusted to a pH of 3.8 by an addition of 50% lactic acid solution, and then homogenized. The mixture was then charged into a bottle and stored in a refrigerator for 2 weeks.

This yogurt beverage maintained a good quality and did not produce a precipitate and supernatant, or gellatilization.

Example 7

A sherbet was prepared according to the following composition.

| | |
|---|---|
| skim milk powder | 1.0 |
| vegetable fats | 1.0 |
| sugar | 8.0 |
| isomerized sugar | 10.0 |
| starch sirup | 5.0 |
| citric acid | 0.15 |
| 4 w/w % hemicellulose solution | 10.0 |
| pigment | 0.02 |
| emulsifier | 0.5 |
| water | 64.23 | i) 1 part of skim milk was added to 20 parts of water and dissolved.
ii) 8 parts of sugar, 10 parts of isomerized sugar and 5 parts of starch sirup were dissolved in 30 parts of water.
iii) 4 parts of hemicellulose were added to 96 parts of water, and the mixture stirred for 10 min. at 80° C. and then cooled to 20° C.
iv) 0.15 part of citric acid was dissolved in 5 parts of water to make an acid solution.
v) Pigment was dissolved in 100 times the amount of water.
vi) 21 parts of a skim milk solution, 53 parts of a sugar solution, 10 parts of a hemicellulose solution, and 2 parts of a pigment solution were mixed. To this mixture, 5.15 parts of an acid solution, perfume, remaining water, emulsifier and fats were added and raised to a temperature of 80° C. while stirring, and the temperature maintained for 10 min.
vii) After homogenizing the solution of vi), the solution was sterilized at 93° C. for 30 sec. and then cooled to 7° C.
viii) The homogenized solution of vii) was aged overnight, and then this solution was foamed in a freezer at −4° C., and stored in the freezer.

An observation of the homogenized solution of viii) showed no precipitate or supernatant.

Example 8

Jelly was prepared according to the following composition,

| | |
|---|---|
| lactic acid beverage | 20.0 |
| sugar | 5.0 |
| 5 w/w % hemicellulose solution | 10.0 |
| carragheenan | 0.5 |
| locust bean gum | 0.1 |
| yogurt flavor | 0.1 |
| water | 64.3 | i) 20 parts of lactic acid beverage were mixed with 20 parts of water.
ii) 5 parts of sugar, 0.5 parts of carragheenan, and 0.1 parts of locust bean gum were dissolved in 30 parts of warm water.
iii) 5 parts of hemicellulose were added to 95 parts of water and stirred at 80° C. for 10 min.
iv) The hemicellulose solution of iii) was cooled to 20° C.,
v) 40 parts of a lactic acid solution, 35.6 parts of a solution of sugar and a gelatinizer, and 10 parts of a 5 w/w % hemicellulose solution were mixed. Then to this mixture were added remaining water and perfume, and it was heated to 75° C. Then the mixture was homogenized.
vi) The homogenized solution was charged into a bottle, gelatinized by immersion in cold water, and stored in a refrigerator for 1 week.

The jelly did not show a protein agglomeration.

Example 9

According to the composition shown in Table 5, boiled fish paste was prepared and tested for palatability and jelly strength.

TABLE 5

Composition of boiled fish paste (parts per weight)

| Component | sample 1 | 2 | 3 | 4 | 5 |
|---|---|---|---|---|---|
| fish paste | 100 | 100 | 100 | 100 | 100 |
| salt | 27 | 2.7 | 2.7 | 2.7 | 2.7 |
| sugar | 1.0 | 1.0 | 1.0 | 1.0 | 1.0 |
| MSG | 0.5 | 0.5 | 0.5 | 0.5 | 0.5 |
| potato starch | 4.0 | 4.0 | 4.0 | 4.0 | 4.0 |
| WSHC (A) | 1.0 | 2.0 | 5.0 | 8.0 | 0.0 |
| water | 40 | 40 | 40 | 40 | 40 |
| WSHC/protein (%) | 7.1 | 14.3 | 35.7 | 57.1 | 0 |

MSG: monosodium glutamate;
WSHM: water-soluble hemicellulose;

The fish paste and salt were mixed, and while adding water gradually, starch and hemicellulose (A) were added and mixed. After putting the mixture on a plate, it was steamed at 90° C. for 30 min.. The results are shown in Table 6.

TABLE 6

| | 1 | 2 | 3 | 4 | 5 |
|---|---|---|---|---|---|
| palatability | 4.0 | 4.2 | 3.5 | 2.0 | 2.7 |
| jelly strength (g · cm) | 577 | 428 | 121 | — | 682 |

In the Table 6, the palatability was evaluated organoleptically by 10 panelists. The evaluation was carried out by scoring from 1 to 5. A score of 5 represents the best properties, and the larger the score the better the properties. The jelly strength of sample 4 was unmeasurable.

From the results, the sample 4 which contains 57.1 parts of hemicellulose per 100 parts of protein was too soft and could not be formed into a product.

Example 10

A separated soybean protein gel was prepared according to the composition of Table 7.

The hemicellulose (B) was dissolved in a salt solution, and to this solution was added separated soybean protein. This mixture was mixed for 2 min., charged into a casing, and then heated at 80° C. for 30 min. After cooling, the jelly strength was measured. The results are shown in Table 7.

TABLE 7

|  | 1 | 2 | 3 | 4 | 5 |
|---|---|---|---|---|---|
| New Fuji Pro SE | 100 | 100 | 100 | 100 | 100 |
| WSHC (B) | 0 | 0.2 | 2 | 5 | 10 |
| 1.5% salt sol. | 400 | 400 | 400 | 400 | 400 |
| WSHC/protein | 0.0 | 0.2 | 2.1 | 5.3 | 10.6 |
| jelly strength | 460 | 465 | 305 | 135 | 95 |

New Fuji Pro SE: separated soybean protein manufactured by Fuji Oil Co.

The larger an amount of hemicellulose, the softer the palatability.

Example 11

Sausage was prepared according to the composition shown in Table 8.

After cutting the meat, spice and additives were added and the whole charged into a casing tube. After smoking, the sausage was steamed at 75° C. for 30 min. and dried at 15° C., 85% humidity. After 10 days, a taste test carried out by 10 panelists.

TABLE 8

|  | 1 | 2 | 3 |
|---|---|---|---|
| beef | 30 | 30 | 50 |
| pork lean meat | 50 | 50 | 50 |
| pork | 20 | 20 | 20 |
| salt | 3.1 | 3.1 | 3.1 |
| sodium sulfate | 0.2 | 0.2 | 0.2 |
| sugar | 0.5 | 0.5 | 0.5 |
| white pepper powder | 0.26 | 0.26 | 0.26 |
| white pepper grain | 0.26 | 0.26 | 0.26 |
| garlic | 0.06 | 0.06 | 0.06 |
| WSHC (C) | 0.5 | 2.0 | — |
| WSHC/protein | 2.6 | 10.5 | 0.0 |
| water content after 2 days | 48.9 | 45.2 | 51.2 |
| water content after 5 days | 34.8 | 32.4 | 37.2 |
| palatability | 4.2 | 3.6 | 23 |

Example 12

A sponge cake was prepared, according to the composition shown in Table 9.

TABLE 9

| component | 1 | 2 | 3 |
|---|---|---|---|
| egg | 100 | 100 | 100 |
| sugar | 100 | 100 | 100 |
| soft flour | 100 | 100 | 100 |
| water | 35 | 35 | 35 |
| emulsified fat | 15 | 15 | 15 |
| king powder | 2 | 2 | 2 |
| WSHC (A) | 1 | 0.08 | 0 |
| WSHC/flour (wt %) | 1 | 0.08 | 0 | emulsified fat: manufacturred by Fuji Oil Co.
WSHC: water-soluble hemicellulose;

Egg and sugar were mixed and emulsified fat, water and flour were added, in that sequence, the specific gravity then adjusted to 0.4, and it was baked at 170° C. for 20 min. The results of an organoleptic evaluation thereof by 10 panelists are shown in Table 10.

TABLE 10

|  | 1 | 2 | 3 |
|---|---|---|---|
| flavor | 4.7 | 4.6 | 4.5 |
| texture | 4.5 | 3.9 | 3.9 |
| palatability | 4.2 | 3.6 | 3.5 |
| swelling | 4.2 | 4.0 | 4.2 |

The evaluation was carried out by scoring from 1 to 5. A score of 5 represents the best properties, and the larger the score the better the properties.

Also a change in the properties of the food after storing same for 7 days was measured. The results are shown in Table 11.

TABLE 11

|  | 1 | 2 | 3 |
|---|---|---|---|
| hardness (0) | 41.8 | 50.2 | 49.9 |
| hardness (7) | 81.6 | 104.2 | 101.1 |
| water content (0) | 35.6 | 35.5 | 35.3 |
| water content (7) | 30.8 | 30.3 | 30.6 |

(0) storage 0 day
(7) storage 7 days

The storage periods (days) are days for which the samples were stored in a closed container at 20° C. The hardness is represented by a load at which sample is pressed to two-thirds of its original thickness.

By using hemicellulose of the present invention at a level of 1 parts per 100 parts of flour, the properties of the sample are improved.

Example 13

A biscuit was prepared according to the composition shown in Table 12.

TABLE 12

| component | 1 | 2 | 3 |
|---|---|---|---|
| soft flour | 100.0 | 100.0 | 100.0 |
| sugar | 40.0 | 40.0 | 40.0 |
| butter | 50.0 | 50.0 | 50.0 |
| yellow of egg | 10.0 | 10.0 | 10.0 |
| baking powder | 1.0 | 1.0 | 1.0 |
| vanilla essence | 0.2 | 0.2 | 0.2 |
| WSHC (B) | 1.0 | 5.0 | 0.0 |
| WSHC/flour | 1 | 5 | 0 |

Butter and sugar were mixed and stirred for 3 min, and to the mixture were added the yolk of an egg, baking powder and hemicellulose, and the whole was stored in a refrigerator for 1 hour, then baked at 180° C. The results of an organoleptic evaluation thereof by 10 panelists are shown in Table 13.

TABLE 13

|  | 1 | 2 | 3 |
|---|---|---|---|
| flavor | 4.5 | 4.2 | 4.2 |
| texture | 4.4 | 4.2 | 3.5 |
| palatability | 3.7 | 3.8 | 2.9 |
| hardness | 3.6 | 4.0 | 3.6 |

By adding the hemicellulose of the present invention, the palatabity of the sample is improved.

Example 15

Foamable test

A 5% solution of the hemicellulose (C) of this invention was prepared, and this solutions was divided into 4 portions Two portion were heated to 80° C. and one was adjusted to a pH of 4.0. The other two portions were not heated and one was adjusted to a pH of 4.0. Then, 50 ml of each sample solution was transferred into a 300 ml beaker, and foamed by a mixer for 1 min. The whole volume and separated water volume were immediately measured, and again after 30 min. and 60 min.

Then, in the same manner, a foamable test was carried out except that the dried white of an egg, a milk serum protein, sodium caseinate and decomposed wheat protein are used instead of hemicellulose. The results were shown in Table 14.

TABLE 14

| | foamability | | | | | |
|---|---|---|---|---|---|---|
| | room temp. | | | heated to 80° C. | | |
| sample component | 0 | 30 min | 60 min | 0 | 30 min | 60 min |
| 1 WSHC | 130 | 130 (25) (20) | 130 (30) (30) | 100 | 100 (25) (28) | 100 (25) (35) |
| 2 dry egg | 200 | 200 (35) | 200 (35) | 70 | — | — |
| | 160 (5) | 160 (30) | 150 (30) | 90 | 90 | 90 |
| 3 milk serum protein | 180 (15) | 70 (45) | — | 170 | — | — |
| | 190 (3) | — | — | 180 | — | — |
| 4 sodium caseinate | 200 | 125 (30) | 60 (45) | 170 | 140 (25) | 80 (35) |
| | 175 (5) | 125 (25) | 70 (30) | 140 | 160 (20) | 80 (25) |
| 5 decomposed wheat protein | 200 | 170 (40) | 70 (45) | 170 (5) | 160 (30) | 80 (35) |
| | 175 (5) | 175 (40) | 170 (45) | 180 (10) | 170 (40) | 125 (42) | upper column: pH not adjusted
lower column: pH adjusted to 4
The value in parentheses is an amount of separated water.

As seen from the above, the foamability of the egg white is good, but this foamability is lost by heating to 80° C. for 30 min. Also, the foamability of milk serum protein, sodium caseinate and wheat protein decomposition product is poor. The foamability of the hemicellulose of the present invention is very good and not affected by heat or pH.

Example 16

The hemicellulose (A) and foaming agent consisting of decomposed soybean protein (trade name, Hifoamer 77) were stirred in water at 80° C. to prepare a solution consisting of 0.2% hemicellulose and 0.5% foaming agent. After measuring the viscosity of the solution, 110 ml of the solution was charged into a 140 ml measuring flask, and after shaking for 1 min., changes in the foaming condition after 10 min. and 24 hours were observed (sample 1).

The foam maintaining test was carried out in the same way as above except that the hemicellulose (c) or λ-carragheenan was used instead of the hemicellulose (A) (respectively, sample 2 and 4).

The foam maintaining test was carried out in the same way as for sample 2 except that the amount of hemicellulose was 5% (sample 3).

The foam maintaining test was carried out in the same way for sample 1 except that only decomposed soybean protein was used as the foaming agent (sample 5).

The results are shown in Table 15.

TABLE 15

| | | | amount of foam and water | | | |
|---|---|---|---|---|---|---|
| | conc. | viscosity | 10 min. | | 24 hr. | |
| composition | % | cps | foam | water | foam | water |
| 1 WHC (A) + DSP | 0.2 + 0.5 | 5.02 | 91 | 47 | 76 | 49 |
| 2 WHC(C) + DSP | 0.2 + 0.5 | 4.93 | 93 | 46 | 80 | 49 |
| 3 WHC(C) + DSP | 5.0 + 0.5 | 15.1 | 91 | 24 | 65 | 49 |
| 4 carragheenan + DSP | 0.2 + 0.5 | 11.3 | 82 | 32 | 35 | 50 |
| 5 DSP | 0.5 | 4.37 | 70 | 48 | 1 | 50 |

As stated above, only the decomposed soybean protein provided a good foam stability, but by adding the hemicellulose of the present invention, the foam stability was improved. Also, the hemicellulose of the present invention is superior to carragheenan.

Although the preferred form of the present invention has been described, it is understood that modifications will be apparent to those skilled in the art, without departing from the spirit of the invention, and thus the scope of the invention is to be determined solely by the following claims.

We claim:

1. A food additive comprising a water soluble hemicellulose wherein the constituent sugar components of the hemicellulose are rhamnose, fucose, arabinose, xylose, galactose, glucose and uronic acid, and an average molecular weight of the hemicellulose is 50,000 to 1,000,000.

2. The food additive according to claim 1, wherein said hemicellulose is prepared by degrading water insoluble vegetable fibers containing protein under acidic conditions, and at a temperature of 100° to 130° C.

3. The food additive according to claim 2, wherein the water-insoluble vegetable fibers containing protein are derived from soybeans.

4. The food additive according to claim 1, which is utilized as a dispersant, a protein stabilizer, a modifier, and/or a foaming agent.

5. A food containing a food additive according to claim 1.

6. A food according to claim 5, which is a protein-containing food.

7. A food according to claims 5, which contains 0.3–50 wt parts of the additive of claim 1 per 100 wt parts of a protein component.

8. A food according to claim 5, which is a bakery product.

9. A food according to claim 8, which contains 0.1–15 wt parts of the additive of claim 1 per 100 wt parts of wheat flour or starch.

10. A food according to claim 6, which is selected from the group consisting of meat, gelled fish products, lactic acid bacteria beverages, fermented milk, acid milk beverages, and acid beverages in which fruit juice or acid is added to a protein.

11. A food according to claim 8, which is a product obtained by baking a raw material such as flour or starch.

12. A food according to claim 11, which is selected from the group consisting of biscuits, crackers, and sponge cake.

* * * * *

UNITED STATES PATENT AND TRADEMARK OFFICE
CERTIFICATE OF CORRECTION

PATENT NO. : 5,342,641
DATED : August 30, 1994
INVENTOR(S) : Kenji Masutake et al.

It is certified that error appears in the above-indentified patent and that said Letters Patent is hereby corrected as shown below:

Column 6, line 37, before "min." insert --10--

Column 7, Example 7, line 30 (chart), after row "pigment 0.02" insert row --perfume 0.1--

Column 8, Table 5, line 38, delete "27" and insert --2.7--

Column 9, Table 8, line 45, delete "23" and insert --2.3--

Column 9, Table 9, line 59, delete "king" and insert --baking--

Column 11, Table 14, line 19, after row "(25) (30)    (25) (25)" insert row --120   120   120   125   120   120--

Signed and Sealed this

Second Day of July, 1996

Attest:

BRUCE LEHMAN

Attesting Officer

Commissioner of Patents and Trademarks